United States Patent [19]

Topcik

[11] Patent Number: 4,659,746
[45] Date of Patent: Apr. 21, 1987

[54] OLEFIN POLYMER FOAMS

[75] Inventor: Barry Topcik, Bridgewater, N.J.

[73] Assignee: Union Carbide Corporation, Danbury, Conn.

[21] Appl. No.: 806,157

[22] Filed: Dec. 12, 1985

Related U.S. Application Data

[63] Continuation-in-part of Ser. No. 684,687, Dec. 21, 1984.

[51] Int. Cl.⁴ ............................................. C08J 9/10
[52] U.S. Cl. ............................... 521/89; 521/95; 521/96; 521/139; 521/140; 521/143
[58] Field of Search ............... 521/89, 139, 140, 96, 521/95, 143

[56] References Cited

U.S. PATENT DOCUMENTS

| | | | |
|---|---|---|---|
| 3,098,831 | 7/1963 | Carr | 521/915 |
| 3,098,832 | 7/1963 | Pooley et al. | 521/915 |
| 3,542,702 | 11/1970 | Okada et al. | 521/140 |
| 3,965,054 | 6/1976 | Nojiri et al. | 521/140 |
| 4,252,909 | 2/1981 | Homma et al. | 521/909 |
| 4,421,867 | 12/1983 | Nojiri et al. | 521/140 |
| 4,424,181 | 1/1984 | Senuma et al. | 521/140 |
| 4,499,210 | 2/1985 | Senuma et al. | 521/140 |
| 4,501,711 | 2/1985 | Senuma et al. | 521/140 |

*Primary Examiner*—Morton Foelak
*Attorney, Agent, or Firm*—James C. Arvantes

[57] ABSTRACT

Olefin polymer foams having improved cell structures and relatively smooth outer surfaces produced by foaming a composition containing a thermoplastic olefin polymer, p,p'-oxybis-benzene sulfonyl hydrazide, a monomeric acrylate ester of a polyhydric compound and an organic peroxide. These foams can be formed into shaped articles of desired configuration by conventional thermoforming molding techniques.

12 Claims, No Drawings

OLEFIN POLYMER FOAMS

This application is a continuation-in-part of copending application Ser. No. 684,687, filed Dec. 21, 1984.

SUMMARY OF THE INVENTION

This invention relates to olefin polymer foams having improved cell structures and relatively smooth outer surfaces, produced by foaming a composition containing a thermoplastic olefin polymer, p,p'-oxybis-benzene sulfonyl hydrazide, a monomeric acrylate ester of a polyhydric compound and an organic peroxide. Foams of the present invention are especially useful in the manufacture of household furniture, recreational products, automotive parts and the like by conventional thermoforming molding techniques.

BACKGROUND OF THE INVENTION

As a general rule, foams are produced by an extrusion operation in which a foamable composition is extruded into a shaped article and the shaped article allowed to expand and foam; or by a compression molding operation. Producing a foam by a compression molding operation is a relatively simple operation which involves, initially, placing a preform of a foamable composition, having a volume equal to about 103 percent of the volume of the mold cavity to provide a seal around the cavity, into the cavity of the mold, placing the filled mold in a hydraulic press and continuing according to Procedures 1 or 2 described below. The foamable composition itself contains a polymer, an organic peroxide, a gas generating compound and generally, well known additives such as anti-oxidants, lubricants and the like.

Procedure 1

The temperature of the hydraulic press is maintained at high levels, generally in excess of about 160° C. and the residence time in the press is such as to achieve substantially full activation of the peroxide and the gas generating compound. The hydraulic press is then opened, allowing the composition to expand and foam.

Procedure 2

The temperature of the hydraulic press is maintained at a level such that the composition is partially cured. The partially cured composition, is preferably cooled, removed from the compression mold, placed in a hot oven and allowed to expand and foam.

Extruding foamable compositions into shaped articles and allowing the shaped articles to expand and foam involves a different set of conditions than those set forth in Procedures 1 and 2. In the production of foams by the "extrusion" technique, the rate of crosslinking of the polymer, i.e. peroxide cure, and the rate of decomposition of the gas generating compound must be carefully balanced. If the rate of crosslinking is too rapid, expansion of the foamable composition will be unduly restricted. On the other hand, if the rate at which the gas generating compound decomposes substantially exceeds the rate at which crosslinking occurs, the evolved gases will escape and little, if any, expansion of the composition will take place.

DETAILED DESCRIPTION OF THE INVENTION

The present invention provides for foams having improved cell structures, that is, relatively small, uniform cells and relatively smooth outer surfaces by either the compression molding operation or by the extrusion technique. Foams of improved quality are produced, according to the present invention, by utilizing, in the foamable compositions, p,p'-oxybis-benzene sulfonyl hydrazide, a monomeric acrylate ester of a polyhydric compound and an organic peroxide wherein the amount of hydrazide, monomeric acrylate ester and organic peroxide are as follows, based upon 100 parts by weight of olefin polymer in the composition:

p,p'-oxybis-benzene sulfonyl hydrazide—about 0.7 to about 3 parts by weight monomeric acrylate ester—about 0.3 to about 2 parts by weight organic peroxide—about 0.5 to about 2 parts by weight Basic foamable compositions of this invention comprise a thermoplastic olefin polymer, an organic peroxide, a gas generating compound, p,p'-oxybis-benzene sulfonyl hydrazide and a monomeric acrylate ester of a polyhydric compound.

Monomeric acrylate esters of polyhydric compounds are commercial products, available from Sartomer Company, a subsidiary of Atlantic Richfield Company, and include triethylene glycol dimethacrylate, ethylene glycol dimethacrylate, tetraethylene glycol dimethacrylate, polyethylene glycol dimethacrylate, 1,3-butylene glycol diacrylate, 1,4-butylene glycol diacrylate, diethylene glycol diacrylate, diethylene glycol dimethacrylate, 1,6-hexane diol diacrylate, polyethylene glycol diacrylate, tetraethylene glycol diacrylate, pentaerythritol tetraacrylate, 1,3-butylene glycol dimethacrylate, trimethylolpropane trimethacrylate, trimethylolpropane triacrylate and the like.

A particularly desirable monomeric acrylate is trimethylolpropane triacrylate.

Olefin polymers which can be foamed in accordance with the present invention are produced by well known methods from monoolefins and diolefins described below.

Suitable monoolefins have the general formula:

$$C_\alpha H_{2\alpha} \qquad \text{Formula I}$$

wherein $\alpha$ has a value of at least 2. Exemplary of olefins falling within the scope of Formula I are: ethylene, propylene, butene-1, pentene-1, 4-methylpentene-1, hexene-1, heptene-1, octene-1 and the like.

Suitable diolefins have the general formula:

$$C_\beta H_{2\beta-2} \qquad \text{Formula II}$$

wherein $\beta$ has a value of at least 3. Exemplary of diolefins falling within the scope of Formula II are: 1,4-pentadiene, 1,3-hexadiene, 1,5-hexadiene, 1,4-octadiene, ethylidene norbornene and the like.

Illustrative of monomers which can be polymerized with monolefins and/or diolefins are styrene, p-methyl styrene, α-methyl styrene, p-chloro styrene, vinyl naphthalene and similar aryl olefins and substituted aryl olefins; nitriles such as acrylonitrile, methacrylonitrile, α-chloroacrylonitrile and the like; vinyl methyl ketone, vinyl methyl ether, vinylidene chloride; vinyl acetate; alkyl acrylates which fall within the scope of the following formula:

FORMULA III

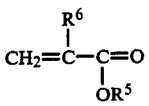

wherein $R^6$ is hydrogen or methyl and $R^5$ is alkyl having 1 to 8 carbon atoms inclusive. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate, chloroethyl acrylate and the like; provided that the olefinic content is at least about 0.1 percent by weight, preferably about 1 to about 50 percent by weight.

It is to be understood that mixtures of reactants can be utilized to produce suitable polymers.

Desirable polymers are alkylene-alkyl acrylate copolymers generally having a density (ASTM D-1505 with conditioning as in ASTM D-147-72) of about 0.92 to about 0.94 and a melt index (ASTM D-1238 at 44 psi tested pressure) of about 0.1 to about 500 decigrams per minute. These copolymers generally have about 1 to about 50 percent by weight combined alkyl acrylate, preferably about 2 to about 20 percent by weight combined alkyl acrylate.

Preferred polymers are ethylene-propylene copolymers, ethylene-butene copolymers, ethylene-hexene copolymers and the like produced under low pressures on the order of about 15 to 300 psi.

Particularly preferred polymers have densities (ASTM D-1505) of about 0.850 to about 0.970, preferably about 0.875 to about 0.930. These polymers can be prepared by reacting a mixture containing about 50 to about 99.9 mole percent, preferably about 75 to about 96 mole percent ethylene and from about 0.1 to about 50 mole percent and preferably about 4 to about 25 mole percent of at least one $C_3$ to $C_8$ alpha olefins previously described.

Illustrative of suitable organic peroxides are the polymer hydroperoxides, such as polyethylene hydroperoxide, and other such polymer hydroperoxides, as for example are disclosed in U.S. Pat. No. 2,911,298, issued Nov. 3, 1959 to Edwin J. Vandenberg; the perester peroxides, such as t-butyl peracetate, t-butyl peroxyisobutyrate, di-t-butyl diperphthalate, t-butyl perbenzoate, di-t-butyl dipermethyl malonate, di-t-amyl dipermethyl malonate, di-t-hexyl diperethyl succinate, di-t-hexyl diperglutarate, di-t-amyl dipersuccinate and the like. for instance as are disclosed in U.S. Pat. No. 2,763,635, issued Sept. 18, 1956 to Charles M. Lucher et al, and as are disclosed in U.S. Pat. No. 2,698,863, issued Jan. 4, 1955 to Frank H. Dickey; diacyl aromatic peroxides exemplary of which are the peroxides having the formula:

wherein $R'$ is an aryl radical, such as benzoyl peroxide, 2,4-dichlorobenzoyl peroxide, p-chlorobenzoyl peroxide and the like; diacryl aliphatic peroxides, such as those having the formula:

wherein $R_2$ is an alkyl group, as for example, acetyl peroxide, caprylyl peroxide, myristoyl peroxide, lauroyl peroxide and the like; dibasic acid peroxides, such as succinic acid peroxide; the ketone peroxides, such as methyl ethyl ketone peroxide, cyclohexanone peroxide and the like; the aldehyde peroxides, such as hydroheptyl peroxide and the like; peroxides having the formula:

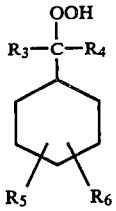

wherein $R_3$ and $R_4$ are alkyl groups, $R_5$ is dialkyl methyl or trialkyl methyl; with the alkyl group in each case containing a maximum of 8 carbon atoms and $R_6$ is hydrogen or an alkyl group containing a maximum of 8 carbon atoms such as 1,1-dimethyl-1-(isopropyl cyclohexyl)methyl hydroperoxide, 1,1-dimethyl-1-(diisopropyl cyclohexyl)methyl hydroperoxide and the like as are further disclosed in U.S. Pat. No. 2,776,954, issued Jan. 8, 1957 to Milton A. Taves; di(aralkyl) peroxides of the formula:

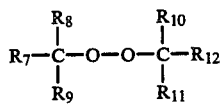

wherein $R_7$ is aryl, $R_8$, $R_9$, $R_{10}$ and $R_{11}$ are hydrogen or alkyl groups of less than 4 carbon atoms and $R_{12}$ is aryl, such as dibenzyl peroxide, bis-($\alpha$-methylbenzyl)peroxide, bis-($\alpha,\alpha$-dimethylbenzyl)peroxide, (di-$\alpha$-cumylperoxide), bis-($\alpha$-propylbenzyl)peroxide, benzyl-($\alpha$-methylbenzyl)peroxide, benzyl-($\alpha$-methyl-p-methylbenzyl)peroxide, benzyl-($\alpha$-methyl-p-isopropylbenzyl)-peroxide and the like as are further disclosed in U.S. Pat. No. 2,826,570, issued Mar. 11, 1958 to Reginald W. Ivett; hydroperoxides, such as 2,5-dimethylhexane-2,5-dihydroperoxide, p-menthane hydroperoxide, t-butylhydroperoxide, benzoin peroxide and the like; di-tertiary alkyl peroxides such as di-t-butyl peroxide, 2,5-bis-(tert-butylperoxy)-2,5-dimethylhexane and the like.

Gas generating compounds are well known in the art and include azodicarbonamide, dinitrosopentamethylenetetramine, N,N'-dimethyl-N,N'-dinitrosoterephthalamide, p-toluene sulfonyl semicarbazide and the like. The actual amounts of gas generating compounds used will depend upon the actual density of foam desired. This amount generally ranges from about 2 to about 20 parts by weight gas generating compound per 100 parts by weight of olefin polymer charged.

Additives such as lubricants, anti-oxidants and the like, all well known in the art, can be added to the foamable compositions.

The foamable compositions are formulated by simply admixing the components in a suitable vessel such as a Brabender mixer, a two roll mill or a Banbury mixer.

Preparation of the foams can be conveniently carried out as described in the examples which follow.

In formulating foamable compositions, mixtures of materials can be used.

Furthermore, by including an unsaturated silane in the composition as described in copending application Ser. No. 684,687, filed Dec. 21, 1984 and assigned to a common assignee, water-curable foams can be prepared in accordance with this invention.

The unsaturated silane, when used, is added in amounts of about 0.5 to about 10 percent by weight, preferably about 1.0 to about 5 percent by weight based on the weight of olefin polymer content.

It is to be understood that the disclosures of all patents and applications noted are incorporated herein by reference.

In the examples and controls which follow, foams were produced by fluxing each composition, the formulations of which are set forth in Table 1 in parts by weight per 100 parts by weight of olefin polymer in the composition, in a Brabender mixer which had been preheated to a temperature of 100° C. to 130° C., pelleting the fluxed composition, extruding the pelletized composition into a sheet of about 3/16 inch in thickness and placing the sheet in an oven which was at a temperature of 180° C.–240° C., activating the organic peroxide and gas generating compound with the result that sheet expanded and foamed.

TABLE 1

|  | Control 1 | Control 2 | Control 3 | Example 1 | Control 4 | Example 2 |
|---|---|---|---|---|---|---|
| Polyethylene having a melt index of 2 | 88.75 | 88.75 | 88.75 | 88.75 | 78.75 | 78.75 |
| Di-α-cumyl peroxide | 1.0 | 1.0 | 1.0 | 1.0 | 1.0 | 1.0 |
| Masterbatch | 30.0 | 30.0 | 30.0 | 30.0 | 30.0 | 30.0 |
| p,p'-Oxybis-benzene sulfonyl hydrazide | — | 2.0 | — | 2.0 | — | 2.0 |
| Trimethylol propane triacrylate | — | — | 1.5 | 1.5 | — | 1.5 |
| Ethylene/propylene/ethylidene norbonene rubber | — | — | — | — | 10.0 | 10.0 |
| Foam |  |  |  |  |  |  |
| Quality | very poor | very poor | poor | excellent | very poor | excellent |
| Density, lbs/ft$^3$ | very high | very high | 2.9 | 2.5 | very high | 2.8 |
| Number of cells per cm.$^2$, counted under a magnifying glass | very low | very low | 105 | 248 | very low | 220 |

The formulation of the masterbatch composition of Table 1 was as follows:

|  | Parts by Weight |
|---|---|
| Ethylene-ethyl acrylate copolymer containing about 18 percent by weight ethyl acrylate | 11.25 |
| Zinc Oxide* | 2.5 |
| Stearic acid (Lubricant) | 1.0 |
| Azodicarbonamide | 15.0 |
| Polymerized 1,2-dihydro-3,4,5-trimethyl quinoline (anti-oxidant) | 0.25 |

*lowers decomposition temperature of the azodicarbonamide

What is claimed is:

1. A foamable composition comprising an olefin polymer, azodicarbonamide, p,p'-oxybis-benzene sulfonyl hydrazide in an amount of about 0.7 to about 3 parts by weight, a monomeric acrylate ester of a polyhydric compound in an amount of about 0.3 to about 2 parts by weight and an organic peroxide in an amount of about 0.5 to about 2 parts by weight wherein the weight is based on olefin polymer content of said composition.

2. A foamable composition as defined in claim 1 wherein said hydrazide is present in an amount of about 2 parts by weight, said monomeric acrylate ester is present in an amount of about 1.5 parts by weight and said organic peroxide is present in an amount of about 1 part by weight.

3. A foamable composition as defined in claim 1 wherein said organic peroxide is di-α-cumyl peroxide.

4. A foamable composition as defined in claim 1 wherein said monomeric acrylate ester is trimethylol propane triacrylate.

5. A foamable composition as defined in claim 1 wherein said olefin polymer is polyethylene.

6. A foamable composition as defined in claim 1 wherein said olefin polymer is an alkylene-alkyl acrylate copolymer.

7. A foamable composition as defined in claim 6 wherein said olefin polymer is an ethylene-ethyl acrylate copolymer.

8. A foamable composition as defined in claim 1 wherein said organic peroxide is di-α-cumyl peroxide and said monomeric acrylate ester is trimethylol propane triacrylate.

9. A foamable composition as defined in claim 2 wherein said organic peroxide is di-α-cumyl peroxide and said monomeric acrylate ester is trimethylol propane triacrylate.

10. A foamable composition as defined in claim 2 wherein said olefin polymer is polyethylene.

11. A foamable composition as defined in claim 2 wherein said olefin polymer is an ethylene-ethyl acrylate copolymer.

12. A foamable composition as defined in claim 1 containing an unsaturated silane.

* * * * *